United States Patent [19]

Friedman et al.

[11] 3,996,316
[45] Dec. 7, 1976

[54] FEED SYSTEM FOR PACKED BED

[75] Inventors: George Friedman, Clark; Harold B. Kohn, Cedar Grove, both of N.J.

[73] Assignee: The Lummus Company, Bloomfield, N.J.

[22] Filed: Aug. 20, 1975

[21] Appl. No.: 606,126

Related U.S. Application Data

[63] Continuation of Ser. No. 417,813, Nov. 21, 1973, abandoned.

[52] U.S. Cl. .................... 261/96; 23/283; 23/288 R; 34/57 A; 261/97
[51] Int. Cl.² ........................ B01D 47/14
[58] Field of Search .............. 261/94–99; 23/270.5 T, 283, 288; 34/57 A

[56] References Cited
UNITED STATES PATENTS

| | | | |
|---|---|---|---|
| 73,073 | 1/1868 | Bierce | 261/96 |
| 362,197 | 5/1887 | Bennett | 261/96 |
| 548,689 | 10/1895 | Wirsching | 261/96 |
| 1,715,252 | 5/1929 | Sperr, Jr. | 261/94 X |
| 2,649,358 | 8/1953 | Palmer | 34/57 A X |
| 3,214,247 | 10/1965 | Broughton | 261/96 X |
| 3,273,872 | 9/1966 | Eckert | 261/97 X |
| 3,392,966 | 7/1968 | Eckert | 261/97 |
| 3,431,084 | 3/1969 | Forbes | 23/288 R |
| 3,469,950 | 9/1969 | Mackley | 23/288 R |
| 3,598,539 | 8/1971 | Pizzato | 261/97 X |

Primary Examiner—Frank W. Lutter
Assistant Examiner—William Cuchlinski, Jr.
Attorney, Agent, or Firm—Marn & Jangarathis

[57] ABSTRACT

Gas feed system for a packed bed in which there is provided a plenum chamber within the packed bed comprised of a plurality of separate members supported by the packing, with gas being introduced into the plenum chamber and fed downwardly through the packing and then upwardly through a distributor to packing above the plenum chamber. A liquid feed system includes a main liquid distributor, auxiliary liquid distributors and associated conduits, all positioned within and supported by the packed bed.

10 Claims, 5 Drawing Figures

U.S. Patent  Dec. 7, 1976  3,996,316
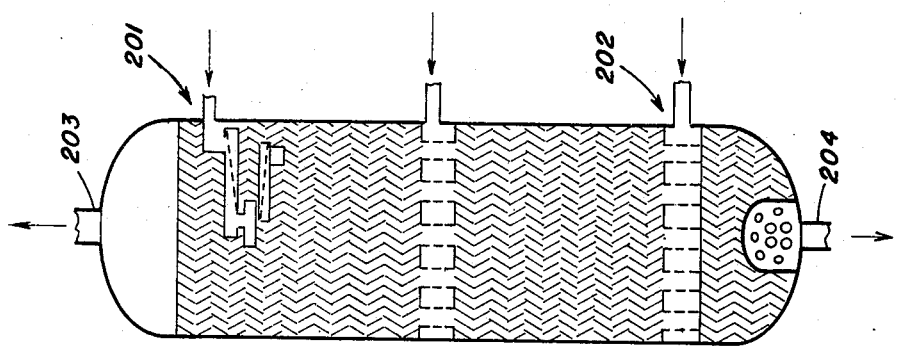
Fig. 5.
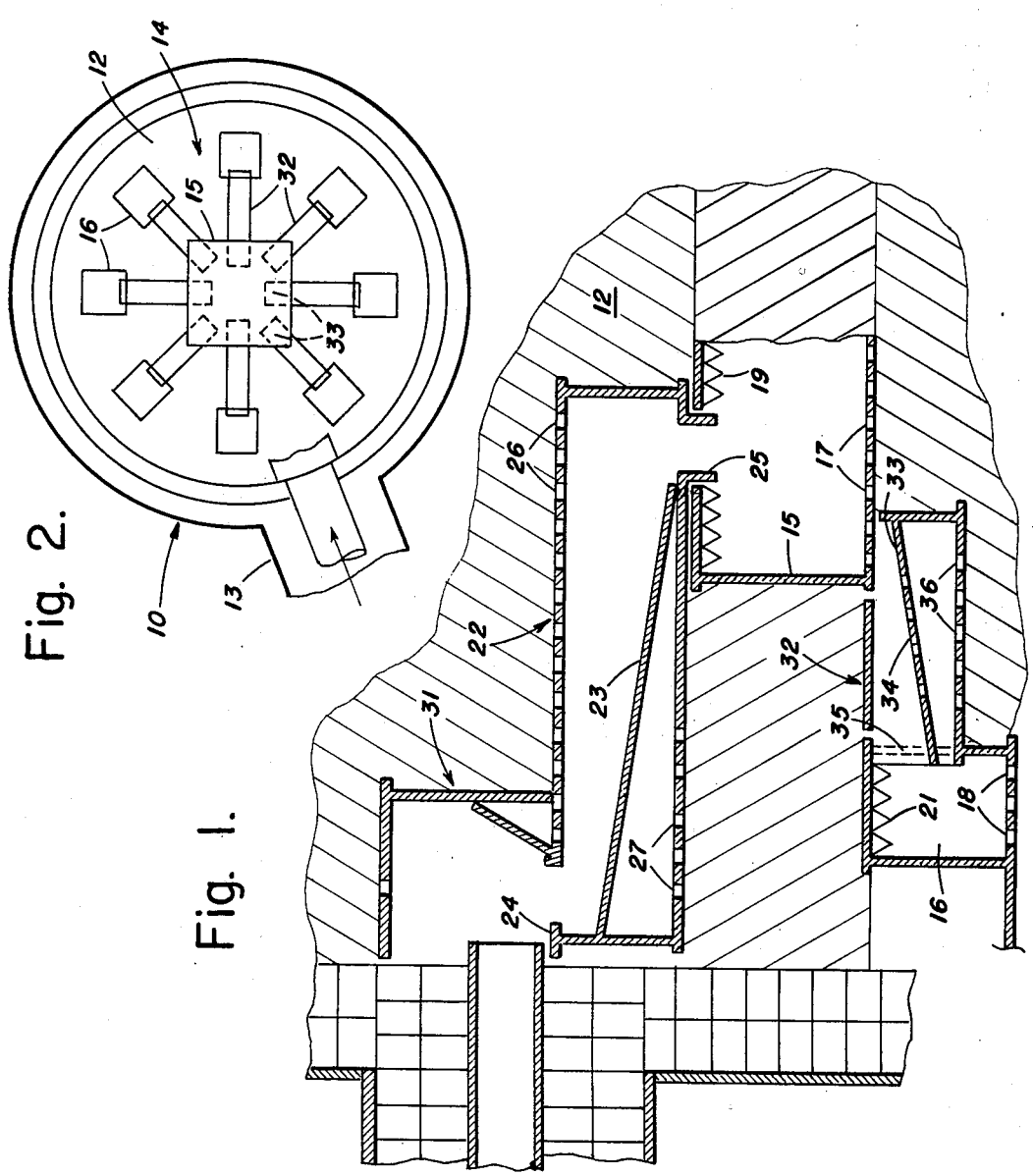
Fig. 1.
Fig. 2.

3,996,316

FEED SYSTEM FOR PACKED BED

This is a continuation of application Ser. No. 417,813, filed Nov. 21, 1973 now abandoned.

This invention relates to packed beds, and more particularly, to a new and improved packed bed contacting apparatus including new and improved means for introducing either a gas and/or liquid into a packed bed.

Packed bed systems are process vessels in which one or more fluids flow through a bed of solid particulate material, such as balls, Raschig rings, saddles, catalyst particles, etc. Flow through packed beds may be one of any of several modes such as gas-liquid, gas, liquid, and liquid-liquid. In all of these systems, the gas and/or liquid is generally introduced into the bed through a suitable distributor such as weir boxes, chimney/sieve plates etc. which are supported on a horizontal plane within the vessel, resulting in independent support structures which are not only costly but also frequently result in superfluous vessel height. In systems which require unusual physical and/or chemical properties for the materials of construction, such as, in high temperature and/or corrosive environments, such devices together with their support structures are not only costly, but are difficult to design and implement. In most cases, this independent support structure incorporates structural devices such as beams or trusses, and in cases where metal is not practical, the use of stoneware arches or domes. As vessel diameters increase, the cost of the internal structure increases disproportionately. Accordingly, there is a need for new and improved means for introducing a gas and/or liquid into a packed bed.

An object of the present invention is to provide a new and improved apparatus for introducing a liquid into a packed bed.

Another object of the present invention is to provide a new and improved apparatus for introducing a gas into a packed bed.

A further object of this invention is to provide a new and improved packed bed contact system which incorporates a new and improved liquid feed system and/or gas feed system.

These and other objects of the present invention will become more readily apparent from reading the following detailed description thereof with reference to the following drawings wherein:

FIG. 1 is a sectional view of a portion of an embodiment of the present invention for introducing a liquid into a packed bed;

FIG. 2 is a top plane view of the embodiment of FIG. 1;

FIG. 5 is a simplified schematic representation of a packed bed incorporating the gas feed embodiment of FIG. 3 and the liquid feed embodiment of FIG. 1.

Figure 4:
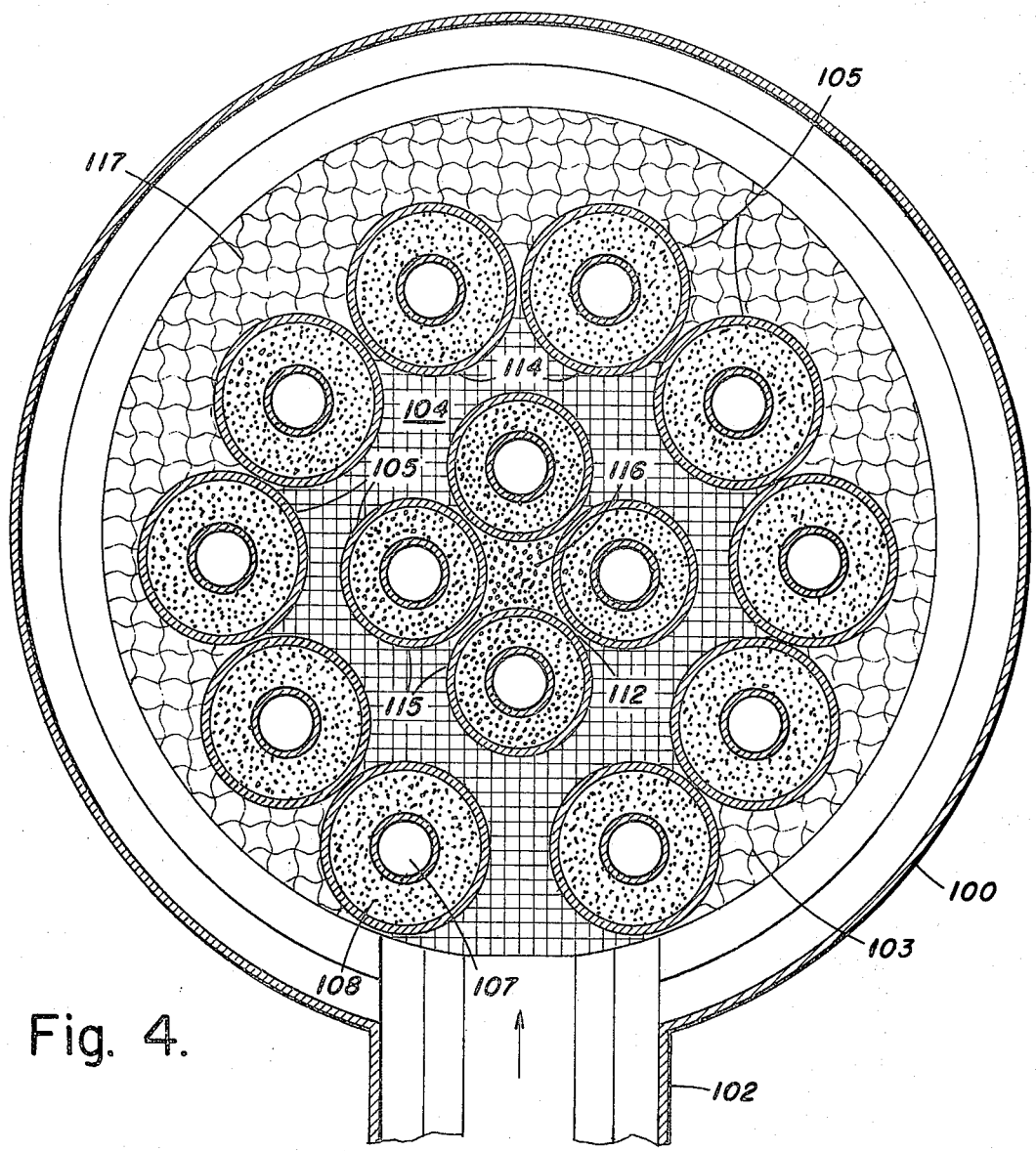
FIG. 4 is a top plane view of the embodiment of FIG. 3.

In accordance with the present invention, there is provided a plurality of separate liquid distributors distributed throughout the packing of a packed bed, with the distributors being supported within and solely by the packed bed whereby there is no need for separate support structure structurally connected to the vessel walls.

More particularly, there is provided a plurality of liquid distributors which are dispersed within and supported by the packed bed, with one of the distributors being a main distributor and preferably being centrally located within the packed bed. The remaining distributors are distributed throughout the bed on a horizontal plane below the main distributor, and the main distributor is interconnected with each of the remaining distributors, whereby liquid feed can be introduced into the main distributor, and distributed therefrom both directly into the bed and into each of the branch distributors. The liquid feed introduced into the branch distributors is then distributed into the packed bed. The distributors employed for separately introducing the liquid into the packed bed may be any one of those typically employed in the art, including perforated distributors and weir boxes. By placing a plurality of distributors below the plane of the main distributor the liquid feed can flow, by gravity, from the main distributor into the remaining distributors.

In accordance with the present invention, the individual distributors of the overall liquid distributing system carry small loads on small spans, and the total load of the distributor system is carried by the packed bed. In this manner, the liquid distributing system is independent of the bed diameter or height. The distributor components can be fabricated of any material which meets the requirements for the process to be effected in the bed, such as, chemical inertness, physical strength and the like. The materials may be metal, stoneware, polymers, etc.

In accordance with the present invention, there is also provided a system for distributing gas into a packed bed. The gas distributing system of the present invention includes a gas plenum chamber within the packing of the bed, and a plurality of gas distributing means supported by and within the packing of the bed for distributing gas from plenum chamber into the packing of the bed. In this manner, as in the case of the liquid distributing means of the present invention, the gas distributing means for introducing gas into a packed bed is independent of the vessel wall, and is supported by and within the packing of the bed. As in the case of the liquid distributing system of the present invention, the components of the gas distributing system may be formed of materials suitable for the requirements of the process, and such materials may include metals, stoneware, polymers, etc.

The invention will be further described with respect to the accompanying drawings, but it is to be understood that the scope of the invention is not to be limited thereby.

Referring now to FIGS. 1 and 2 of the drawings which illustrate an embodiment of the liquid distributor of the present invention, a vessel 10 is provided with suitable packing, schematically illustrated as 12. The upper portion of the vessel 10 is provided with a liquid feed inlet 13 for introducing liquid feed into the vessel 10 for distribution thereof into the packing through the liquid distributing apparatus of the present invention.

The liquid distributing apparatus of the present invention, generally indicated as 14, is comprised, in its major parts, of a main distributor box 15, positioned in the packing in a plane below the plane on which the liquid feed inlet 13 is located; and a plurality of branch distributor boxes 16, positioned on a plane below the plane of the main distributor box 15. As particularly shown, the main distributor box 15 is centrally positioned in the vessel 10 and the plurality of branch distributor boxes 16 are circularly arranged about the main distributor box 15, but it is to be understood that other arrangements may also be employed. The main distributor box 15 and the plurality of branch distributor boxes 16 are positioned within and are supported by the packing and, accordingly, there is no need for separate and independent support structure for the boxes 15 and 16. The main distributor box 15, and each of the branch distributing boxes 16, are provided with means for distributing liquid from the boxes into the bed. As particularly shown, such means is in the form of a plurality of perforations or orifices 17 in the bottoms of box 15, and a plurality of perforations or orifices 18 in the bottom of boxes 16, but it is to be understood, that other means, such as, notched weirs, etc. may be employed instead of perforations. The upper portion of main box 15 is preferably provided with a notched weir 19 to accomodate for overflow or liquid surge, and the branch distributor boxes 16 are also preferably provided with notched weirs 21 for the same purpose.

A main spillway 22 is positioned within and supported by the packing 12 between the liquid inlet 13 and the main distributor 15 for receiving liquid introduced through the inlet 13 and transporting same to the main distributor box 15. The main spillway 22 is supported on a packing level above the packing level which supports the main distributor box 15, and as particularly shown, is provided with a downwardly inclined interior surface 23 on which the liquid is transported from the main spillway inlet 24, positioned adjacent to the liquid feed inlet 13, to the main spillway outlet 25, positioned above and in fluid flow communication with main distributor box 15. The main spillway 22 is also provided with suitable vent orifices 26 and drain orifices 27.

A main liquid deflector 31 is positioned within and supported by the packing 11, at a packing level above the packing level supporting main spillway 22, directly opposite liquid inlet 13, to insure that the liquid introduced through the feed inlet 13 is directed into the main spillway 22.

A plurality of branch spillways 32 (one for each branch distributor box 16) are positioned within and supported by the packing 11, between each branch distributor box 16 and the main distributor box 15, for receiving liquid from the main distributor box and transporting same to the branch distributor boxes. The branch spillways 32 are supported on a packing level below the packing level which supports the main distributor box 15, and above the packing level which supports the branch distributor boxes 16. The inlet portion 33 of the branch spillways 32 are positioned below and around the outer perimeter of the orifices 17 of the main distributor box 15 whereby one portion of the liquid introduced into the main distributor box 15 is distributed through the outer portion of the orifices 17 to the branch spillways 32, and a further portion of the liquid is distributed through the central portion of the orifices 17 into the bed packing. As particularly shown, the branch spillways 32 are provided with a downwardly inclined interior surface 34 on which liquid is transported to the outlet portion 35 of the spillways 32 for introduction into the branch distributor boxes 16. The branch spillways 32 are also provided with suitable drain orifices, generally indicated as 36.

In operation, liquid feed introduced through inlet 13 is passed through main spillway 22 to the main distributor box 16. The liquid introduced into the main distributor box 16 is distributed, through orifices 17, to the bed packing and the branch spillways 32. The liquid introduced into branch spillways 32 is passed to the branch distributor boxes 16 and distributed, through orifices 18, to the bed packing. As particularly shown, the liquid distributing system 14 is comprised of eight branch distributor boxes and one main distributor box, with about 50% of the liquid introduced into the main distributor box 15 being distributed to the branch spillways for distribution to the packing through the branch distributor boxes 16, and about 50% of the liquid being introduced into the center of the packing through the main distributor box 15. It is to be understood, however, that other arrangements are possible within the spirit and scope of the invention.

As should be apparent from the hereinabove description, the liquid distributing system is structurally independent of the vessel wall in that the system is supported in and by the bed packing. The number of branches, dimension of components, etc. is a function of bed size, packing characteristics, maximum and minimum flow quantities, properties of the liquid, etc. and the design of such components is well within the scope of those skilled in the art from the teachings herein. Similarly, the packing may shift within normal expectations causing some tilting of the components of the distributing system and such tilting may be compensated for by selection of the slope of the spillways and liquid head over perforations or weirs.

Figure 3:
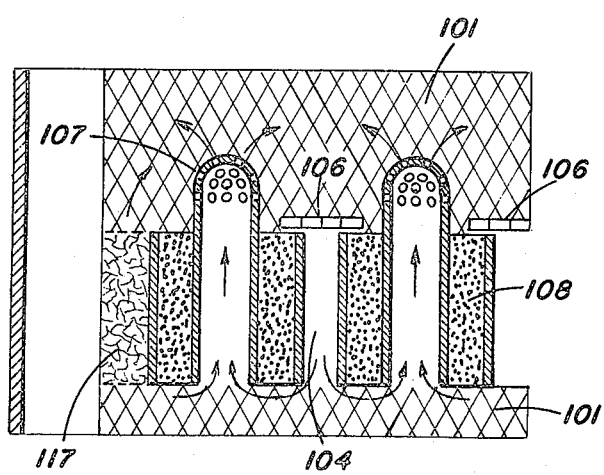
FIG. 3 is a partial sectional view of an embodiment of the present invention for introducing a gas into a packed bed.

The invention will now be further described with respect to FIGS. 3 and 4 of the drawings which illustrate a preferred embodiment of a distributor of the present invention for distributing a gas to a packed bed.

Referring now to FIGS. 3 and 4, a vessel 100 is provided with suitable process packing 101 and a gas feed inlet 102 for introducing gas into the gas distributor of the present invention, generally indicated as 103, positioned within and supported by the process packing 101.

The gas distributor 103 is comprised of a gas plenum chamber 104, within the interior of the process packing, and a plurality of pillars 105, in the form of hollow pipe sections, which includes means as hereinafter described for distributing gas into the process packing above plenum chamber 104.

As particularly shown, a plurality of the pillars 105 are supported within and by the process packing in a contiguous relationship to define an outer perimetric wall 114 of the plenum chamber 104. A further portion of the pillars 105 are centrally positioned within and supported by the process packing to provide means for distributing gas into the central portion of the process packing above plenum chamber 104. As particularly shown, the centrally positioned pillars 105 are positioned in a contiguous relationship to define an inner perimetric wall 115 of the plenum chamber 104, with the voids between the central pillars being filled with a packing 116 preferential for a liquid. Similarly, the voids between the outer pillars 105 and the wall of vessel 100 are filled with a packing 117 preferential for a gas.

The plenum chamber 104 is open at its bottoms whereby the process packing defines the floor of the plenum chamber and is closed at its top by a roof, defined by a plurality of roof slabs 106, supported between the pillars 105. Accordingly, gas introduced into plenum chamber 104, through gas inlet 102, can not directly flow from the plenum chamber 104 into the process packing above plenum chamber 104.

The interior of the pillars 105 include means for passing and distributing gas into the processing packing, above the plenum chamber 104, in the form of risers 107, concentrically positioned within and spaced from the walls of the pillars 105. It is to be understood that other means, such as packing preferential to a gas can be used for effecting such distribution.

It is to be understood that the risers 107 function to distribute gas which flows out of the bottom of plenum chamber 104 into the packing above the plenum chamber. In the case, where the gas distributor is employed as an intermediate gas feed, the gas passing through the packing below the plenum chamber is also distributed through risers 107 into the packing above the plenum chamber. The interior of the pillars 105 further include means for distributing liquid from the packing above the plenum chamber into the packing below the plenum chamber, in the form of packing 108 preferential for liquid, positioned between the risers 107 and the walls of the pillars 105.

In operation, gas feed is introduced into plenum chamber 104 through gas inlet 102 and flows out of the open bottoms thereof. The gas feed then flows through the risers 107 and packing preferential for a gas 117 along with any gas from the packing below the plenum chamber, into the process packing above the plenum chamber. The liquid from the packing above the plenum chamber flows through the packing 108, preferential for liquid into the packing below the plenum chamber.

As should be apparent from the hereinabove description, the gas distributor of the present invention is comprised of a gas plenum chamber within the packing, and means for distributing the gas from the gas plenum chamber into the packing above the plenum chamber which is supported within and by the process packing, whereby the gas distributor is structurally independent of the vessel wall. The design of the various components to achieve the required capacity and gas paths is within the scope of those skilled in the art from the teachings herein.

Referring to FIG. 5 of the drawings, there is shown a packed bed containing a liquid feed distributor according to the present invention designated as 201, and gas feed distributors, according to the present invention, designated as 202 for introducing gas feed at both an intermediate and lower portion of the packed bed. The vapor is withdrawn from the packed bed through vapor outlet 203 and the liquid is withdrawn from the bed through liquid outlet 204.

The present invention is particularly advantageous in that liquid and/or gas can be introduced into a packed bed contacting apparatus through distributors which are structurally independent of the vessel wall. This results in a savings with respect to structural cost and vessel height. In addition, the components may be constructed of materials suitable for the conditions and/or materials employed in the bed. The present invention achieves such results, in part, by departing from the previously accepted principle that distributing parts must be in a single horizontal plane and by structurally supporting the various component parts within and by the packed bed.

Numerous modifications and variations of the present invention are possible in light of the above teachings and, therefore, within the scope of the appended claims, the invention may be practised otherwise than as particularly described.

What is claimed:

1. A contacting apparatus, comprising:
    a vessel;
    a packed bed within the vessel;
    an inlet pipe connected to the vessel wall for introducing liquid into the packed bed;
    a main liquid distributor positioned entirely within and supported solely by the packed bed;
    a main liquid conduit positioned entirely within and supported solely by the packed bed for passing liquid from the inlet pipe to the main liquid distributor;
    a plurality of auxiliary liquid distributors for distributing liquid into the packed bed positioned entirely within and supported solely by the packed bed; and
    a plurality of auxilliary liquid conduits positioned entirely within and supported solely by the packed bed for passing liquid from the main liquid distributor to the auxilliary liquid distributors.

2. The apparatus of claim 1 wherein said main liquid distributor is positioned at an intermediate portion of said packed bed and said auxilliary liquid distributors are positioned radially outwardly from and below said main liquid distributor.

3. The apparatus of claim 1 wherein the main liquid conduit is supported within and by the packed bed on a plane above the plane on which said main liquid distributor is supported, said auxilliary conduits being supported within and by the bed on the plane below the main distributor and said auxilliary distributors being supported by the bed on a plane below the auxilliary conduits.

4. The apparatus of claim 1 wherein the main liquid distributor is centrally positioned within the bed and the auxilliary distributors are positioned radially outwardly from the main distributor.

5. The apparatus of claim 1 and further comprising means defining a gas plenum chamber within the packed bed, packing of said packed bed defining a floor for the plenum chamber, gas feed inlet means for introducing gas into the plenum chamber; and a plurality of gas distributing means supported solely by and within the packed bed in fluid communication with packing above and below said plenum chamber, whereby gas flows through the packing floor thereof and gas distributing means into packing above said plenum chamber.

6. The apparatus of claim 1 wherein the packing is supported on the bottom of the vessel.

7. A contacting apparatus, comprising:
    a vessel; a packed bed within the vessel; means defining a gas plenum chamber within the packed bed, packing of said packed bed defining a floor for the plenum chamber; gas feed inlet means for introducing gas into the plenum chamber; a plurality of gas distributing means supported solely by and within the packed bed, in fluid communication with packing above and below said plenum chamber; and roof means for preventing vapor from flowing from said plenum chamber directly to packing above the plenum chamber whereby gas flows from the plenum chamber through the packing floor thereof and through the gas distributing means into packing above said plenum chamber.

8. The apparatus of claim 7 wherein said means defining the plenum chamber comprises a plurality of separate members distributed within and supported by the packing defining an exterior wall for said plenum chamber.

9. The apparatus of claim 8 wherein said plurality of separate members have an open interior which is in communication with the packing above and below the plenum chamber, a portion of the interior of said separate members including said gas distributing means and another portion of the interior of said member including means for distributing liquid from packing above said plenum chamber to packing below said plenum chamber.

10. The apparatus of claim 9 wherein the plurality of gas distributing means are a plurality of risers.

* * * * *